March 31, 1953  R. B. HOUPLAIN  2,633,213
SELF-LOCKING DEVICE
Filed July 12, 1947  4 Sheets-Sheet 1
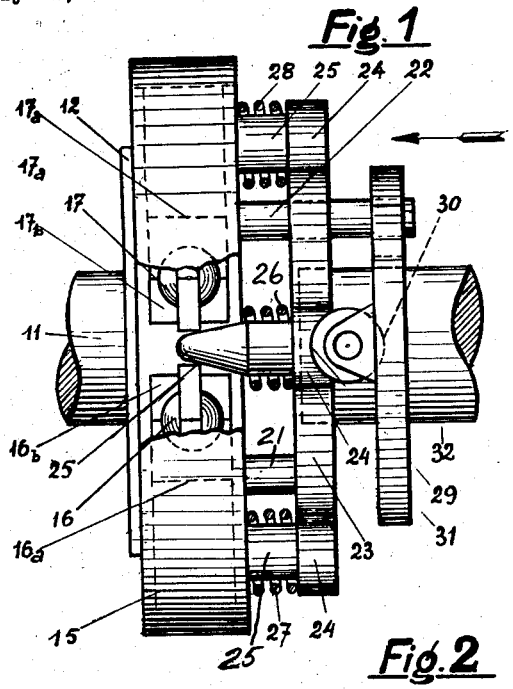
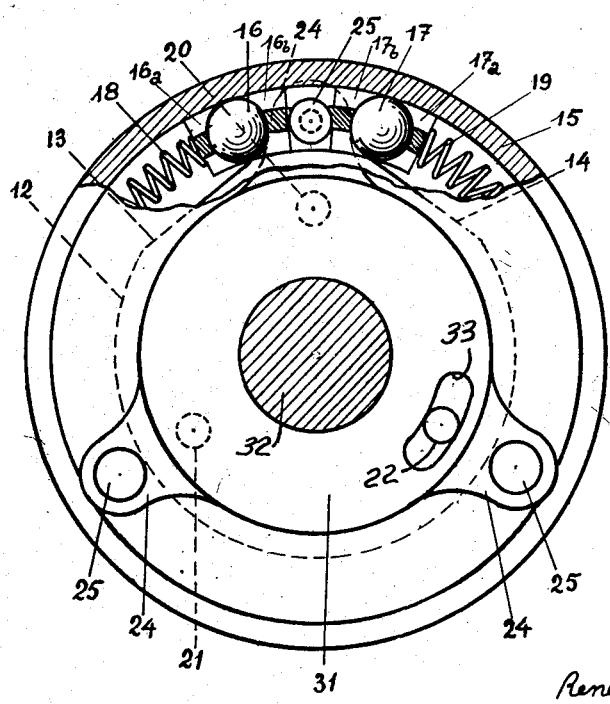
INVENTOR.
René Benjamin Houplain
BY
Dale A. Bauer
ATTORNEY.

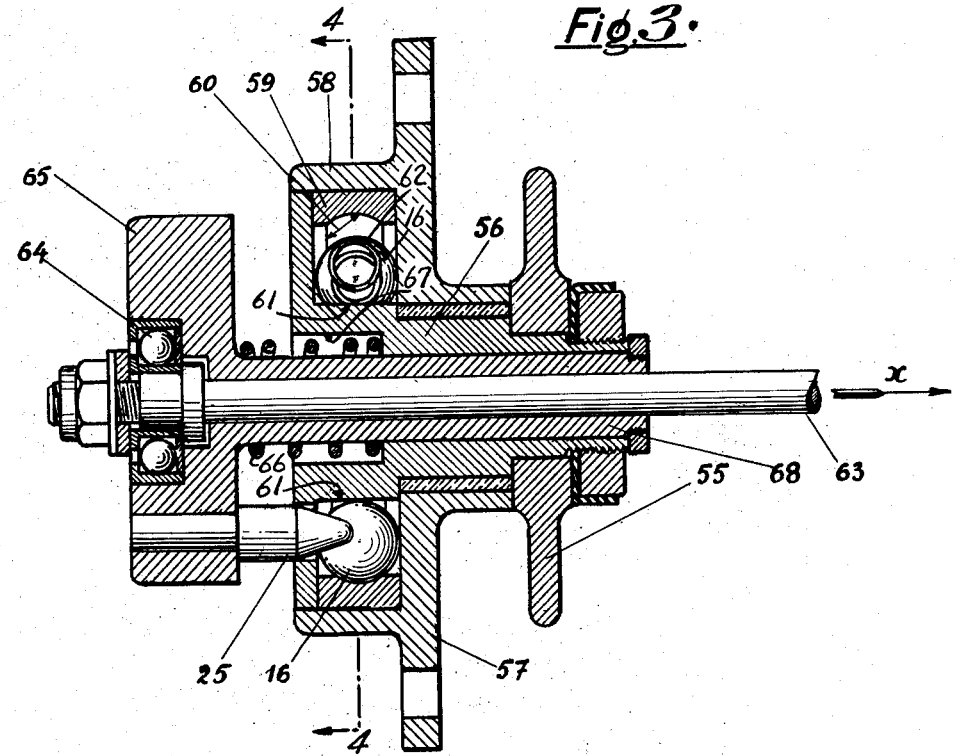
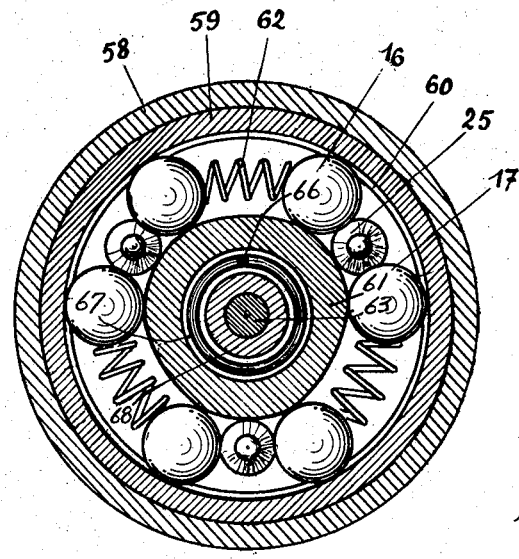

March 31, 1953 — R. B. HOUPLAIN — 2,633,213

SELF-LOCKING DEVICE

Filed July 12, 1947 — 4 Sheets-Sheet 3

INVENTOR.
René Benjamin Houplain
BY
Dale A. Bauer
ATTORNEY.

March 31, 1953  R. B. HOUPLAIN  2,633,213
SELF-LOCKING DEVICE
Filed July 12, 1947  4 Sheets-Sheet 4
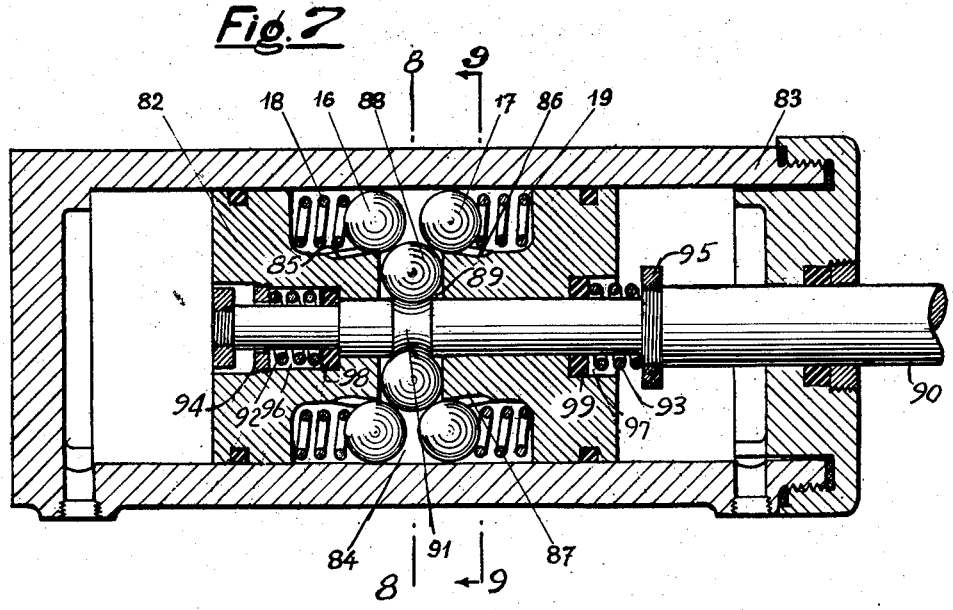
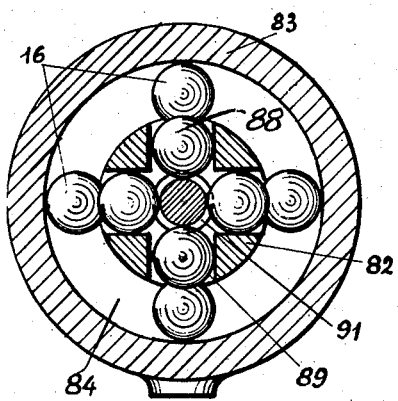
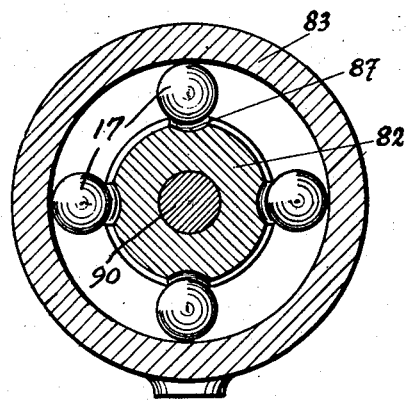
INVENTOR.
René Benjamin Houplain
BY
Dale A. Bauer
ATTORNEY Patented Mar. 31, 1953

2,633,213

UNITED STATES PATENT OFFICE 2,633,213

SELF-LOCKING DEVICE

René Benjamin Houplain, Paris, France

Application July 12, 1947, Serial No. 760,521
In France May 20, 1947

14 Claims. (Cl. 192—8)

The present invention relates to a self-locking device allowing to lock automatically a driven member movable in two opposite directions as soon as a normal manual force or any normal driving or controlling power ceases to be applied on said member; this locking being effected by means of a wedging mechanism comprising a plurality of pairs of wedging rollers which are submitted to two antagonistic forces tending constantly to draw them nearer to each other and thereby to wedge them between a reaction surface and a surface forming two ramps or slopes inclined in opposite directions and acting as a double-cam; one of these surfaces forming an integral part of said driven member or being solidary of its movements in order that one roller of each pair of wedging rollers act instantly to lock it in one direction and the other to lock it in the other direction as soon as a force or a reaction independent from this normal drive or control tends to displace said driven member.

The driven member may be any member, movable in two opposite directions, which has to be immobilized between two successive operations of its driving member. This self-locking device may be adapted advantageously to any driving mechanism, nonreversible transmission mechanism, control, clutch, coupling device, etc., comprising such driven member.

The invention consists more particularly in improvements brought to the unwedging means used in self-locking devices of the above-mentioned type to free the driven member when it is desired to control its position or to drive it by means of a driving or controlling member. The invention refers more specially to the case where the driven member is submitted to forces or reaction foreign to its normal drive or control which tend to displace it undesirably in one direction or the other independently of this normal drive or control.

In the known self-locking or irreversible devices of this type, the release of the driven member is effected by an unwedging member, solidary of the movement of this driving or controlling member, which acts but on one of the two rolling wedges against the action of only one of the two antagonistic forces, so as to release the driven member only in the direction of its drive or control, just before the establishment of a positive coupling between the driven member and said driving or controlling member.

It happens often in practice that the control or drive of the driven member, in these known self-locking or irreversible devices, takes place irregularly or requires an unwedging force relatively large, due to the fact that the other rolling wedge, the one which prevents the movement of the driven member in the direction opposed to the drive or control, remains wedged or is intermittently rewedged after the other wedge has been displaced in the direction of the drive or control by the unwedging member solidary of the movements of the driving or controlling member. This happens specially when the two antagonistic forces acting on the two rolling wedges are constituted by springs bearing on the driven member itself, because in that case, as the fulcrum of the spring acting on the other wedge moves in the direction of the drive as soon as a positive coupling is established between the driven member and the driving member and, as this spring remains under tension and continues to act on this other wedge, this latter has a tendency to move at a speed slightly higher than the speed of the driven member, therefore tends to be intermittently rewedged.

The object of the present invention is to remedy to these drawbacks and is essentially characterized in that the unwedging member of the self-locking device is constituted by an auxiliary wedge which can be inserted between the each pair of wedging rollers so as to act simultaneously on said wedging rollers and to push them apart in opposite directions against the action of the two antagonistic forces every time one desires to release the driven member.

As examples four embodiments of the invention will now be described with reference to the accompanying drawings, in which:

Figs. 1 and 2 are respectively a plan view and an end view of a first embodiment of the device according to the invention, adapted to the coupling of a driven shaft to a coaxial driving shaft;

Figs. 3 and 4 are respectively an axial section and a transversal section made along line 4—4 of Fig. 3 and show a second embodiment adapted to lock or release a wheel which may be either driven or driving;

Figure 5:
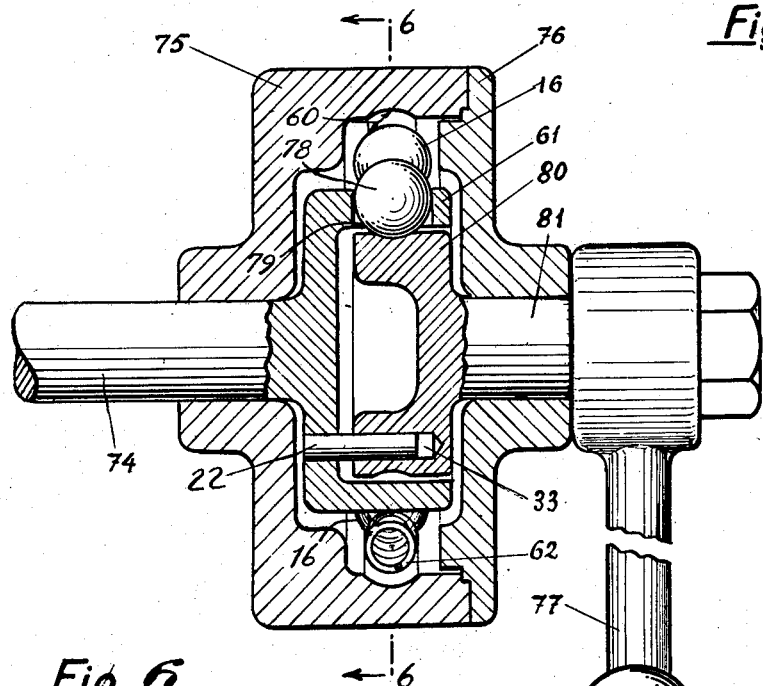
Figs. 5 and 6 show likewise in axial section and in transversal section along line 6—6 of Fig. 5 a third embodiment of the device according to the invention adapted to the coupling between a driven shaft and a control lever so as to lock this shaft between two successive operations of said lever and, respectively, to release this shaft immediately before each operation of this lever.

Finally Figs. 7, 8 and 9 show respectively in axial section and in transversal sections made along lines 8—8 and 9—9 of Fig. 7 a fourth and last embodiment adapted to lock a piston in its cylinder.

In the example of Figs. 1 and 2, the driven member is constituted by a shaft 11 carrying on one of its extremities a concentric cam 12. On the periphery of this cam are provided two flattened portions forming two opposed ramps or slopes 13 and 14. Around this cam 12 is mounted in any suitable manner (not shown) a fixed ring 15 coaxial with the shaft 11 and the cam 12. Between the inner periphery of this ring 15, acting as reaction surface, and the outer periphery of cam 12 are mounted two wedging balls 16—17 submitted to the action of two antagonistic springs 18, 19 tending constantly to draw these balls nearer to each other and thereby to wedge them between the ramps 13, 14 and the fixed ring 15. Between each ball and each spring is interposed a bearing of cruciform section 16a, 17a in which is provided a spherical seat on the side of the ball. Two symmetrical bearings 16b, 17b are mounted between the two balls for a reason which will be described later. The cam 12, solidary of the driven shaft 11, and cooperating with balls 16, 17 and the fixed ring 15 to lock shaft 11, carries three guiding rods 20, 21, 22 parallel to the driven shaft 11. On these rods is slidably mounted a disc 23 having three radial extensions 24 carrying three unwedging fingers 25 terminating in a cone which is inserted between the two inner bearings 16b, 17b separating the two balls 16, 17. This disc 23 is submitted to the axial action of three springs 26, 27, 28, mounted on the fingers 25 and tending constantly to push this disc away from the cam 12. Sliding disc 23 is also provided, on its face opposed to the cam 12, with a notch or symmetrical ramp 29 cooperating with a roller 30 carried by a second disc 31 secured on a driving shaft 32. This second disc 31 is furthermore provided with a circular relatively short slot 33 in which penetrates one of the three guiding rods 20, 21, 22 for example, the rod 22, which is made longer than the two other rods 20 and 21.

The organization is such that, when the driving shaft 32 is driven in one direction, the roller 30 overrides the notch 29 and thereby pushes away the sliding disc 23 towards cam 12 against the action of springs 26, 27, 28. During this displacement of the disc 23 parallel to itself, each of the three conical ends of unwedging fingers 25, carried by this disc 23, draws apart the two bearings 16a, 17a separating the two balls 16, 17, which latter are in turn drawn apart from each other against the action of the springs 18, 19 and are thereby displaced in opposite directions along the opposed ramps 13, 14 of the cam 12, so as to release this latter. As soon as the unwedging of the balls 16, 17 is effected and as soon as the cam 12 is thus released, one of the extremities of the circular groove 33 of the disc 31 secured on the driving shaft 32 meets the rod 22 inserted therein, thereby establishing a positive coupling between the driven shaft 11 and the driving shaft 32.

In order to simplify the drawing, one has shown in Figs. 1 and 2 but a single pair of balls 16, 17 and of opposed ramps 13, 14 but it must be well understood that the device comprises for obvious reasons of symmetry and balance of forces, three pairs of balls cooperating, on the one hand with three conical unwedging fingers and, on the other hand, with three double-ramps provided on the periphery of cam 12.

In the example shown in Figs. 3 and 4, the member to be automatically locked is constituted by a driving or a driven wheel 55 secured on an outer sleeve 56 mounted so as to be able to rotate in two directions of rotation in a fixed horizontal bearing 57. This bearing presents on its face opposed to the wheel 55 a circular projection or drum 58 in which is secured a ring 59 forming the reaction surface of the wedging mechanism. In this ring 59 is provided a circular groove 60 acting as rolling track for three pairs of wedging balls 16, 17 which cooperate with a triple cam 61 formed on the outer sleeve 56 to lock normally the wheel 55 in both directions under the action of three springs 62, interposed between these three pairs of balls.

In this example, the release of the movable member 55 is obtained by means of an axially movable pulling rod 63 on which is mounted by the intermediary of a roller bearing 64 a disc 65 carrying the three unwedging cones 25 and submitted to the axial action of a return spring 66 of the pulling rod 63. The spring 66 leans against the bottom of a cylindrical hole 67 provided inside the cam 61. The disc 65 constitutes the head of an inner sleeve 68 solidary of both the axial movement of the pulling rod 63 and of the angular movement of the outer sleeve 56 and of the cam 61.

It will be seen that in this example, in order to release the movable member 55, it is sufficient to operate a slight pull in the direction of the arrow $x$ on the pulling rod 63 against the action of the return spring 66 by means of any suitable pulling control member, for instance by means of a Bowden cable of the pulling type.

Figure 6:
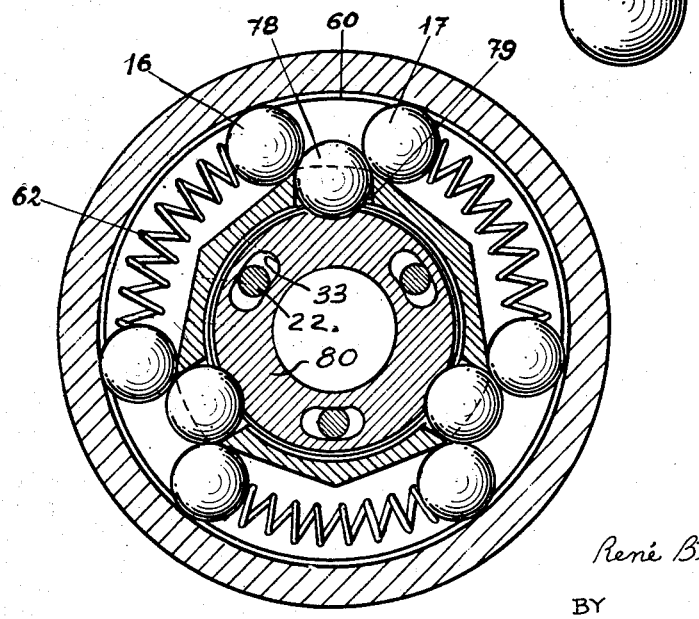

In the third example (Figs. 5 and 6) the driven member is a shaft or torque tube 74 rotatably mounted in the flange 75 of a closed fixed bearing and driven by means of a control lever 77, the hub 81 of which is aligned with the shaft 74 and is mounted in the opposed flange 76 of the closed bearing 75—76. In this example, the ensemble of the self-locking device according to the invention is lodged in the closed bearing 75—76 and comprises a wedging mechanism very similar to the one of the example of Figs. 3 and 4 except that the rolling track 60 for the three pairs of wedging balls 16, 17 is provided directly in the inner periphery of the closed bearing 75, 76 and except further that the triple cam 61 is integrally formed at the extremity of shaft 74.

Instead of conical unwedging members, one uses in this example, in order to spread simultaneously the three balls 16 apart from the three balls 17 against the action of the three springs 62, three unwedging balls 78, freely mounted in three radial cylindrical holes 79 provided at 120° from each other in the cam 61 and simultaneously operated at the beginning of each operation of control lever 77 by the intermediary of an inner cam 80 integrally formed at the extremity of the hub 81 of the control lever 77. As soon as the outer cam 61 and the shaft 74 are thus released, one of the extremities of each circular groove 33 of the inner cam 80 reaches the corresponding rod 22, carried by the outer cam 61, inserted therein, thereby establishing a positive coupling between the driven shaft 74 and the control lever 77.

Although in the example described thereabove, the movable member that one wishes to lock between two successive drives or controls is a rotative member capable of turning in both directions of rotation, it is obvious that the invention is not limited to such driven members submitted to angular movements, and that the self-locking device according to the invention is likewise equally well adapted to lock a movable member submitted to an alternative movement of translation, such as a piston, a sleeve, a slide, etc.

In the case of an irreversible hydraulic system for instance the piston of which must be normally locked in its cylinder in a determined position as soon as one ceases to act thereon by the intermediary of its rod, and that in spite of the pressure differential acting on its opposed faces, one could advantageously use a self-locking device according to the invention, such as the one shown in Figs. 7 to 9 of the accompanying drawings. In this last example the wedging mechanism is constituted by a circular series of pairs of balls 16, 17 with springs 18, 19 working axially between a piston 82 and the inner periphery of a cylinder 83 in an elongated annular groove 84 of the piston. The bottom of this groove forms a double-cam 85, 86 provided with as many longitudinal grooves 87 acting as rolling tracks as there are pairs of balls. In this example the unwedging means are constituted by four balls 88 working radially in the plane of symmetry of the pairs of spring-actuated balls 16, 17 within cylindrical radial holes 89 bored at right angles to each other in the piston 82. These four unwedging balls 88 are simultaneously operated by the piston rod 90 which is mounted with a certain axial play in the axis of the piston and is provided opposite the holes 89 with a circular groove 91 forming the normal rest seat of these unwedging balls 88. The self-locking device according to the invention comprises furthermore in this example means to return automatically the piston rod in its neutral position in the middle of its axial play. These means may be for instance two antagonistic springs 92, 93 mounted between the piston 82 and two circular shoulders 94, 95 of the piston rod 90. These springs 92, 93 are preferably lodged in two annular chambers 96, 97 formed at the two extremities of the piston 82 and act simultaneously in opposite directions on two rubber rings 98, 99 acting as packing rings between the piston and its rod.

The piston 82 provided with such a wedging mechanism, will be automatically locked under the action of the springs 18, 19 of the wedging balls 16, 17 as soon as one ceases to act on its rod 90 and as soon as this latter will be brought back in its neutral median position by the two antagonistic springs 92, 93, and that so much harder as the difference between the respective pressures acting on the opposed faces of the piston will be larger, and the unwedging balls 88 will simultaneously override their rest seats in the circular groove 91 and will simultaneously spread apart all the unwedging balls against the action of their springs as soon as the rod 90 will start to move axially in either direction.

As soon as one of the shoulders 94 or 95, after having compressed the adjacent spring 92, or 93, will meet the corresponding face of piston 82, a positive mechanical coupling between the piston and its rod will be established. The continuation of the motion of this rod will then drive the piston and will prevent any rewedging of the balls 16, 17 as these balls are kept apart in their position of rest by the cylindrical periphery of rod 90 during all the duration of the motion of the piston 89.

Many changes could be made in any of these examples and embodiments thereabove described without departing from the spirit and the scope of the invention. For instance, in certain special cases, in which the movable member works effectively but in one direction of motion, one could use only the half of one of the wedging mechanism shown, the unwedging member (cone or ball) acting then only on one rolling wedge 16 or 17 against the action of a single spring 18 or 19.

What I claim is:

1. Piston in cylinder locking gear including depressed cam seats in the piston body between its ends, a piston rod having limited axial movement through the piston, a cam surface on said rod, balls riding the piston cam seats into locking engagement with the cylinder wall, impelling means for directing the balls up the cam seats, and a ball riding the surface of the rod adapted to be displaced by the piston rod cam to separate the said balls and free the piston.

2. In a self-locking mechanism for automatically locking a driven member, in combination, a movable cam shaped member fastened to said driven member and having its periphery formed so as to provide wedging ramps, a fixed member providing a reaction surface surrounding said cam shaped member, a plurality of pairs of wedging rollers located between said wedging ramps and said reaction surface, means for yieldably holding the wedging rollers in wedging engagement with said movable cam shaped member and said fixed member to lock the cam shaped member and the driven member to the latter, a driving member operably connected to said driven member for limited movement relative thereto, and release members insertable between each pair of wedging rollers in response to limited relative movement of said driving and driven members to force said rollers simultaneously apart and out of said wedging position so that the cam shaped member and driven member are released for movement.

3. In a self-locking mechanism for automatically locking a driven member, in combination, a movable cam shaped member fastened to said driven member and having its periphery formed so as to provide wedging ramps, a fixed member providing a reaction surface surrounding said cam shaped member, a plurality of pairs of wedging rollers located between said wedging ramps and said reaction surface, means for yieldably holding the wedging rollers in wedging engagement with said movable cam shaped member and said fixed member to lock the cam shaped member and the driven member to the latter, guiding rods parallel to the axis of and carried by said cam shaped member, a disc slidably mounted on said guiding rods and carrying a plurality of pins parallel to said guiding rods and each having a conical end portion insertable between each of said pairs of wedging rollers, and means fastened to a driving member adapted to move said disc towards said cam shaped member upon rotation of said driving member so as to insert said pins between each pair of wedging rollers for moving said wedging rollers simultaneously out of said wedging position.

4. In a self-locking mechanism for automatically locking a driven member, in combination, a movable cam shaped member fastened to said driven member and having its periphery formed so as to provide wedging ramps, a fixed member providing a reaction surface surrounding said cam shaped member, a plurality of pairs of wedging rollers located between said wedging ramps and said reaction surface, means for yieldably holding the wedging rollers in wedging engagement with said movable cam shaped member and said fixed member to lock the cam shaped member and the driven member to the latter, a plurality of bores formed in said cam shaped member, a disc provided with a plurality of spherical recesses rotatably mounted inside said cam shaped member, a release ball in each of said bores interposed between the wedging rollers and said recesses and insertable between each pair of wedging rollers, and means for rotating said disc so as to force the release balls to ride up the sides of the said recesses and to move said wedging rollers apart and out of said wedging position.

5. In a self-locking mechanism for automatically locking a driven member, in combination, two cam shaped parts provided on said driven member and having their periphery formed so as to provide wedging ramps, a fixed member providing a reaction surface surrounding said two cam shaped parts of said driven member, a plurality of pairs of wedging rollers located between said ramps and said reaction surface, means for yieldably holding the wedging rollers in wedging engagement with said cam shaped parts and said fixed member to lock the driven member to the latter, a shaft passing through said driven member and having a circular groove, a plurality of radial bores in said driven member located between said two cam shaped parts and extending to said groove, a release ball in each of said bores and insertable between each pair of wedging rollers, and means adapted to move said shaft in one or the other direction so as to force the release balls to ride up the sides of said bores and to move said wedging rollers apart and out of said wedging position.

6. A self-locking mechanism as defined in claim 2 comprising cam means interposed between said driving member and said release members for actuating said release members.

7. A self-locking mechanism as defined in claim 2 comprising resilient means for urging said release members to inoperative position and cam means for moving said release members to operative position.

8. In a self-locking mechanism for automatically locking a driven member, a movable cam shaped member fastened to said driven member and having its periphery formed so as to provide wedging ramps, a fixed member providing a reaction surface surrounding said cam shaped member, at least one pair of wedging rollers located between said wedging ramps and said reaction surface, means for yieldably holding said wedging rollers in wedging engagement with said movable cam shaped member and said fixed member to lock the cam shaped member and the driven member to the latter, a driving member operably connected to said driven member for limited movement relative thereto, and a release member insertable between said pair of wedging rollers in response to limited relative movement of said driving and driven members to force said rollers simultaneously apart and out of said wedging position so that the cam shaped member and driven member are released for movement relative to said fixed member.

9. A self-locking mechanism as defined in claim 8 comprising cam means interposed between said driving member and said release member.

10. A self-locking mechanism as defined in claim 9 wherein said cam means includes a convex cam surface on said driving member.

11. A self-locking mechanism as defined in claim 9 wherein said cam means includes a concave cam surface on said driving member.

12. In apparatus of the class described, a reversible driving member, a reversible driven member, means for connecting said members for limited movement relative to each other in both directions, cam means on said driven member, a fixed member surrounding said cam means, releasable locking means including a pair of rollers cooperating with said cam means and said fixed member for normally locking said driven member to said fixed member against movement in either direction, and means including a wedge-like member simultaneously engageable with both rollers of said pair and operable in response to relative movement of said driving and driven members for simultaneously moving said rollers in opposite directions for releasing said locking means.

13. A self-locking mechanism as defined in claim 4 comprising means connecting said driven member to said disc for limited movement relative thereto, the magnitude of said limited movement being sufficient to permit the release balls to ride up the sides of said recesses.

14. Locking gear comprising fixed and movable ball tracks, a pair of balls bearing on said tracks, converging cam faces in the movable tracks, said pair of balls riding the cam faces into opposite locking engagement, impelling means impelling said pair of balls into locking engagement with said cam faces, another movable member having a cam surface, and a ball aligned between said pair of balls subject to displacement by the cam surface to move said pair of balls into unlocking engagement upon motion of said last-named movable member.

RENÉ BENJAMIN HOUPLAIN.

REFERENCES CITED

The following references are of record in the file of this patent:

UNITED STATES PATENTS

| Number | Name | Date |
|---|---|---|
| 1,152,075 | Buschmann | Aug. 31, 1915 |
| 1,808,008 | Schmithals | June 2, 1931 |
| 2,202,217 | Mallory | May 28, 1940 |
| 2,251,466 | Payson | Aug. 5, 1941 |
| 2,299,739 | Colucci | Oct. 27, 1942 |
| 2,447,469 | Spraragen | Aug. 17, 1948 |

FOREIGN PATENTS

| Number | Country | Date |
|---|---|---|
| 7,827 | Great Britain | Apr. 3, 1907 |
| 377,378 | France | July 9, 1907 |
| 736,218 | France | Sept. 12, 1932 |